United States Patent  
Zhang et al.

(10) Patent No.: US 12,352,706 B2
(45) Date of Patent: Jul. 8, 2025

(54) MULTI-CHANNEL RADIOGRAPHIC INSPECTION DEVICE

(71) Applicant: NUCTECH COMPANY LIMITED, Beijing (CN)

(72) Inventors: Li Zhang, Beijing (CN); Qingping Huang, Beijing (CN); Mingzhi Hong, Beijing (CN); Zinan Wang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 242 days.

(21) Appl. No.: 18/037,617

(22) PCT Filed: Sep. 17, 2021

(86) PCT No.: PCT/CN2021/118975
§ 371 (c)(1),
(2) Date: May 18, 2023

(87) PCT Pub. No.: WO2022/105404
PCT Pub. Date: May 27, 2022

(65) Prior Publication Data
US 2024/0027369 A1    Jan. 25, 2024

(30) Foreign Application Priority Data

Nov. 19, 2020  (CN) .......................... 202011305516.9

(51) Int. Cl.
*G01N 23/00*    (2006.01)
*G01N 23/04*    (2018.01)
*G01N 23/083*   (2018.01)

(52) U.S. Cl.
CPC ........... *G01N 23/083* (2013.01); *G01N 23/04* (2013.01); *G01N 2223/3303* (2013.01)

(58) Field of Classification Search
CPC ........... G01N 2223/3303; G01N 23/04; G01N 23/083; G01V 5/22
See application file for complete search history.

(56) References Cited

U.S. PATENT DOCUMENTS

| 11,822,043 B2 | 11/2023 | Chen et al. |
| 2002/0172324 A1 | 11/2002 | Ellengogen |

(Continued)

FOREIGN PATENT DOCUMENTS

| CN | 203275671 U | 11/2013 |
| CN | 106596601 A | 4/2017 |

(Continued)

OTHER PUBLICATIONS

Extended European Search Report dated Sep. 13, 2024 for EP Application No. 21893555.9 (7 pages).

(Continued)

*Primary Examiner* — Dani Fox
(74) *Attorney, Agent, or Firm* — Merchant & Gould P.C.

(57) ABSTRACT

A radiographic inspection device is provided, including: a plurality of inspection channels, a scanning apparatus, a driving apparatus and a controller. The plurality of inspection channels are arranged side by side, and each inspection channel is configured to carry an object to be inspected. The scanning apparatus includes a radiation source mounted outside the plurality of inspection channels, and a receiving apparatus mounted outside the plurality of inspection channels and configured to receive a radiation beam emitted from the radiation source. The driving apparatus is configured to drive the radiation source and the receiving apparatus to move to a vicinity of each inspection channel. The controller is configured to control the scanning apparatus moved to the vicinity of one of the plurality of inspection channels to scan the object in the one of the plurality of inspection channels.

20 Claims, 10 Drawing Sheets

(56) References Cited

U.S. PATENT DOCUMENTS

| | | | |
|---|---|---|---|
| 2004/0232054 A1 | 11/2004 | Brown et al. | |
| 2006/0291622 A1 | 12/2006 | Smith et al. | |
| 2007/0165777 A1 | 7/2007 | Anwar et al. | |
| 2013/0034268 A1* | 2/2013 | Perron | G01V 5/22 382/103 |
| 2015/0030125 A1* | 1/2015 | Pfander | G01V 5/22 378/57 |
| 2015/0185356 A1 | 7/2015 | Tang et al. | |
| 2017/0357857 A1 | 12/2017 | Perron | |

FOREIGN PATENT DOCUMENTS

| | | |
|---|---|---|
| CN | 108414546 A | 8/2018 |
| CN | 109407163 A | 3/2019 |
| CN | 109613031 A | 4/2019 |
| CN | 209132182 U | 7/2019 |
| CN | 211669384 U | 10/2020 |
| WO | 2020/140972 A1 | 7/2020 |

OTHER PUBLICATIONS

International Search Report with Written Opinion for PCT application No. PCT/CN2021/118975 dated Nov. 23, 2021 (8 pages).
English Translation of International Search Report for PCT Application No. PCT/CN2021/118975 mailed Nov. 23, 2021 (2 pages).
Chinese Office Action dated Jun. 5, 2023 for corresponding Chinese application No. 202011305516.9 (19 pages including English Translation).

* cited by examiner

MULTI-CHANNEL RADIOGRAPHIC INSPECTION DEVICE

CROSS-REFERENCE TO RELATED APPLICATIONS

This application is a National Stage Application of International Application No. PCT/CN2021/118975, filed 17 Sep. 2021, which claims benefit of Ser. No. 20/201, 1305516.9, filed 19 Nov. 2020 in China, and which applications are incorporated herein by reference. To the extent appropriate, a claim of priority is made to each of the above disclosed applications.

TECHNICAL FIELD

Embodiments of the present disclosure relate to a radiographic inspection device, and in particular to a multi-channel radiographic inspection device having a plurality of parts in which objects to be inspected may be placed.

BACKGROUND

Based on requirements of public safety, it is usually to perform a non-invasion inspection on an object such as a luggage or a parcel by using a security inspection system in large public places such as large-scale exhibitions, temporary highway inspection stations, border inspection ports or stadiums. For example, a radiographic inspection device mounted in a vehicle is used to inspect whether a prohibited item such as a drug or an explosive exists in the object or not. The radiographic inspection device mainly includes an inspection channel and a scanning apparatus. An object to be inspected passes through the inspection channel of the radiographic inspection device by using a conveying structure. The scanning apparatus mainly includes a radiation source mounted on one side of the inspection channel and configured to emit an X-radiation beam, and a detector array mounted on the other side of the inspection channel and configured to receive the radiation beam.

In an existing radiographic inspection device, the object to be inspected is scanned in a single inspection channel, and the scanning apparatus is capable of scanning the object to be inspected in the single inspection channel only, so that an efficiency of inspection is low. At present, a dual-channel radiographic inspection device has been developed. The object to be inspected in each inspection channel may be scanned, but it is required to arrange an independent scanning apparatus in each inspection channel, thereby increasing a cost of the radiographic inspection device.

SUMMARY

The purpose of the present disclosure is to solve at least one aspect of the above problems and defects in the existing technologies.

According to an embodiment of an aspect of the present disclosure, a radiographic inspection device is provided, including: a plurality of inspection channels arranged side by side, each inspection channel configured to carry an object to be inspected; a scanning apparatus including a radiation source mounted outside the plurality of inspection channels and a receiving apparatus mounted outside the plurality of inspection channels and configured to receive a radiation beam emitted from the radiation source; a driving apparatus configured to drive the radiation source and the receiving apparatus to move to a vicinity of each inspection channel; and a controller configured to control the scanning apparatus moved to the vicinity of one of the plurality of inspection channels to scan the object in the one of the plurality of inspection channels.

According to an embodiment of the present disclosure, the driving apparatus is configured to drive the radiation source and the receiving apparatus to synchronously reciprocate in a first direction, so as to cause the scanning apparatus to move to the vicinity of each inspection channel in sequence.

According to an embodiment of the present disclosure, each inspection channel includes: an inspection space enclosed by a housing; and a first sensor configured to detect whether the object exists in the inspection channel, wherein the controller controls the scanning apparatus to scan the object when the first sensor detects that the object exists in the inspection channel.

According to an embodiment of the present disclosure, each inspection channel further includes: at least one gate disposed on at least one of an entrance of the inspection space and an exit of the inspection space, and configured to close the entrance and the exit during scanning of the object to be inspected which has been placed into the inspection space and/or close the entrance and the exit when a suspicious item is inspected in the object by the scanning apparatus.

According to an embodiment of the present disclosure, each inspection channel includes: a second sensor configured to detect that the gate is closed or opened. The controller controls the scanning apparatus to scan the object in the inspection space when the second sensor detects that the at least one gate is closed.

According to an embodiment of the present disclosure, the scanning apparatus further includes a shielding apparatus configured to prevent the radiation beam emitted from the radiation source from being emitted into the inspection space, when the first sensor of the inspection channel detects that no object exists in the inspection space, or when the second sensor of the inspection channel detects that the gate is opened.

According to an embodiment of the present disclosure, the controller turns off the radiation source of the scanning apparatus moved to the vicinity of the inspection channel, when the first sensor of the inspection channel detects that no object exists in the inspection space, or when the second sensor of the inspection channel detects that the gate is opened.

According to an embodiment of the present disclosure, the controller controls the driving apparatus to drive the scanning apparatus to pass through the inspection channel at a fast speed, when the first sensor of the inspection channel detects that no object exists in the inspection space, or when the second sensor of the inspection channel detects that the gate is opened.

According to an embodiment of the present disclosure, the radiation source is configured to emit a plurality of radiation beams in different directions; and the receiving apparatus includes a plurality of detector arrays, in which receiving surfaces of the plurality of detector arrays are inclined with each other, so as to respectively receive the plurality of radiation beams emitted in different directions.

According to an embodiment of the present disclosure, the driving apparatus includes: a first driving apparatus configured to drive the radiation source to move; a second driving apparatus configured to drive the receiving apparatus to move; and a synchronization module configured to control the first driving apparatus and the second driving apparatus to synchronously drive the radiation source and the receiving apparatus.

According to an embodiment of the present disclosure, the first driving apparatus includes: a first driver; a first base on which the radiation source is mounted; and a first guide rail, wherein the first driver drives the first base to reciprocate straight along the first guide rail.

According to an embodiment of the present disclosure, the first driver includes: a first motor; and a first screw, wherein one end of the first screw is coupled to an output shaft of the first motor, and the first screw fits the first base by thread, such that a rotation of the first screw is converted into a linear movement of the first base.

According to an embodiment of the present disclosure, the second driving apparatus includes: a second driver; a second base on which the receiving apparatus is mounted; and a second guide rail, wherein the second driver drives the second base to reciprocate straight along the second guide rail.

According to an embodiment of the present disclosure, the second driver includes: a second motor; and a second screw, wherein one end of the second screw is coupled to an output shaft of the second motor, and the second screw fits the second base by thread, such that a rotation of the second screw is converted into a linear movement of the second base.

According to an embodiment of the present disclosure, the plurality of inspection channels are arranged in a row in a horizontal direction, the radiation source is disposed in an upper wall of a housing of the inspection channel, and the receiving apparatus is disposed in a lower wall of the housing of the inspection channel.

According to an embodiment of the present disclosure, the plurality of inspection channels are arranged in a row in a horizontal direction, the radiation source is disposed in a lower wall of a housing of the inspection channel, and the receiving apparatus is disposed in an upper wall of the housing of the inspection channel.

According to an embodiment of the present disclosure, the plurality of inspection channels are arranged in an upper row and a lower row which extend in a horizontal direction, one radiation source and one receiving apparatus are respectively disposed on opposite sides of each row of inspection channels.

According to an embodiment of the present disclosure, the plurality of inspection channels are arranged in an upper row and a lower row which extend in a horizontal direction, one radiation source is provided between the upper row of inspection channels and the lower row of inspection channels, and one receiving apparatus is provided on a side of each row of inspection channels opposite to the radiation source, wherein the radiation source is rotatable, such that the radiation beam emitted from the radiation source is selectively irradiated to the receiving apparatus.

According to an embodiment of the present disclosure, the plurality of inspection channels are arranged in a right row and a left row which extend in a vertical direction, one radiation source is provided between the right row of inspection channels and the left row of inspection channels, and one receiving apparatus is provided on a side of each row of inspection channels opposite to the radiation source, wherein the radiation source is rotatable, such that the radiation beam emitted from the radiation source is selectively irradiated to the receiving apparatus.

According to an embodiment of the present disclosure, the plurality of inspection channels are arranged in a right row and a left row which extend in a vertical direction, one radiation source and one receiving apparatus are respectively disposed on opposite sides of each row of inspection channels.

According to an embodiment of the present disclosure, each inspection channel further includes a conveying apparatus disposed at a lower part of the inspection channel and configured to convey the object in a second direction perpendicular to a first direction.

DETAILED DESCRIPTION OF EMBODIMENTS

Figure 1:
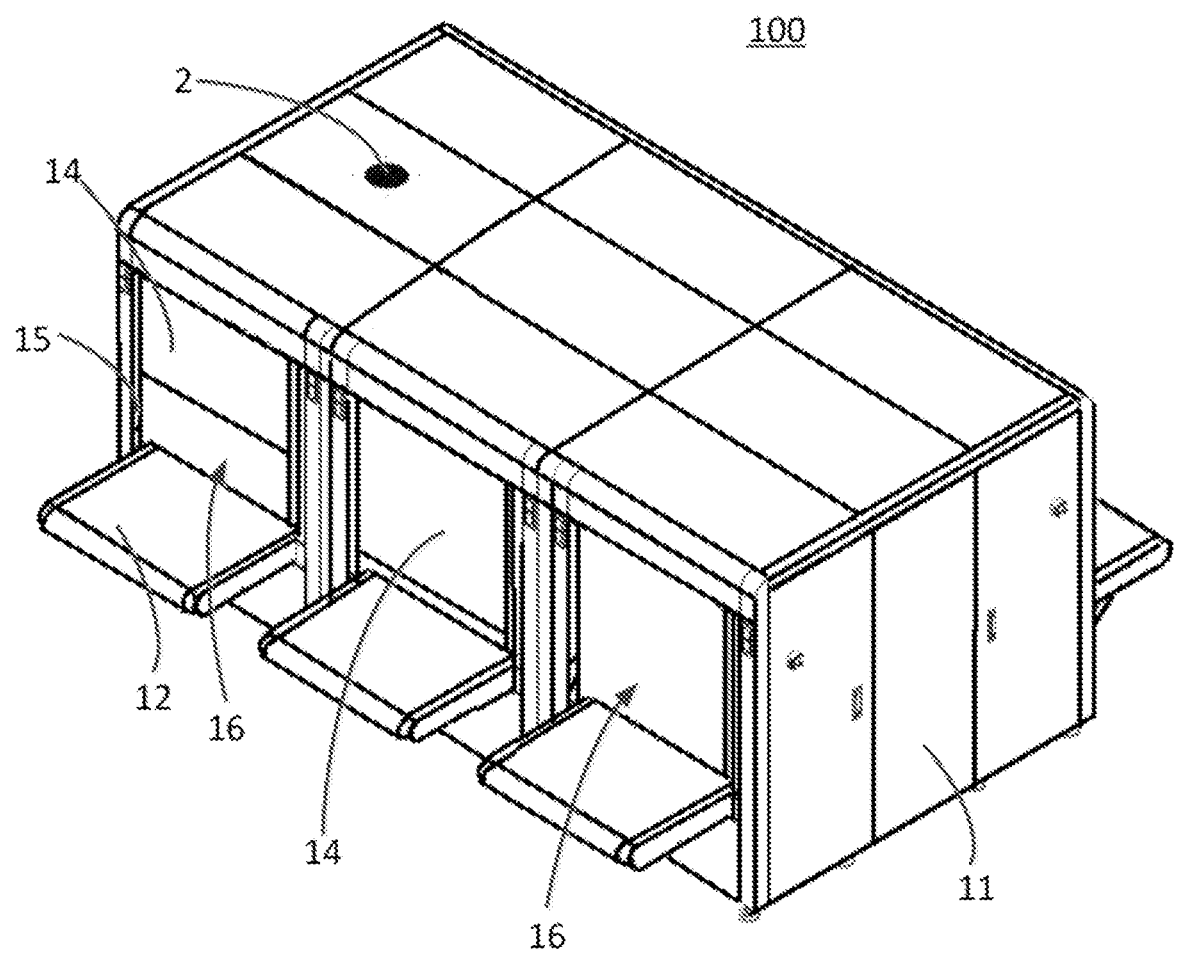
FIG. 1 shows a three-dimensional schematic view of a radiographic inspection device of an exemplary embodiment of the present disclosure.

With reference to accompanying drawings in embodiments of the present disclosure, the technical solution in embodiments of the present disclosure will be described clearly and completely. Apparently, embodiments described are only some embodiments of the present disclosure, rather than all embodiments. The description of at least one exemplary embodiment below is actually only explanatory, and it will never be used as any limitation on the present disclosure and its application or use. Based on embodiments in the present disclosure, all other embodiments derived by those of ordinary skill in the art without creative labor, fall within the scope of protection of the present disclosure.

In the following detailed descriptions, for purposes of explanation, many specific details are elaborated to provide a comprehensive understanding of embodiments of the present disclosure. However, it is clearly that one or more embodiments may be implemented without these specific details. In other cases, well-known structures and devices are illustrated to simplify the accompanying drawings. It may not be discussed in details about technologies, methods and devices known by those of ordinary skill in the art in related fields, but in an appropriate case, the technologies, methods and devices should be regarded as a part of the granted description.

In the description of the present disclosure, it should be understood that an orientation or position relationship indicated by words such as "front, back, up, down, left, right", "lateral, longitudinal, vertical, horizontal" and "top, bottom" and other positions, is just to facilitate the description of the present disclosure and simplify the description, based on the orientation or position relationship shown in the figures. Without an opposite explanation, these orientation words do not indicate and suggest devices or components referred to that must have a specific orientation or construct or operate in a specific orientation, so it should not be understood as a limitation on the scope of protection of the present disclosure. The orientation word "inner or outside" refers to an inside or an outside of a contour of each component itself.

In the description of the present disclosure, it should be understood that it is just to facilitate differences in corresponding parts, by using words "first" and "second" to define parts. If there is no other statements, the above words have no special meaning, which should not be understood as a limitation on the scope of protection of the present disclosure.

According to a general concept of an invention of the present disclosure, a radiographic inspection device is provided, including: a plurality of inspection channels, a scanning apparatus, a driving apparatus and a controller. The plurality of inspection channels are arranged side by side, and each inspection channel is configured to carry an object to be inspected. The scanning apparatus includes: a radiation source mounted outside the plurality of inspection channels, and a receiving apparatus mounted outside the plurality of inspection channels and configured to receive a radiation beam emitted from the radiation source. The driving apparatus is configured to drive the radiation source and the receiving apparatus to move to a vicinity of each inspection channel. The controller is configured to control the scanning apparatus moved to the vicinity of one of the plurality of inspection channels to scan the object in the one of the plurality of inspection channels.

Figure 2:
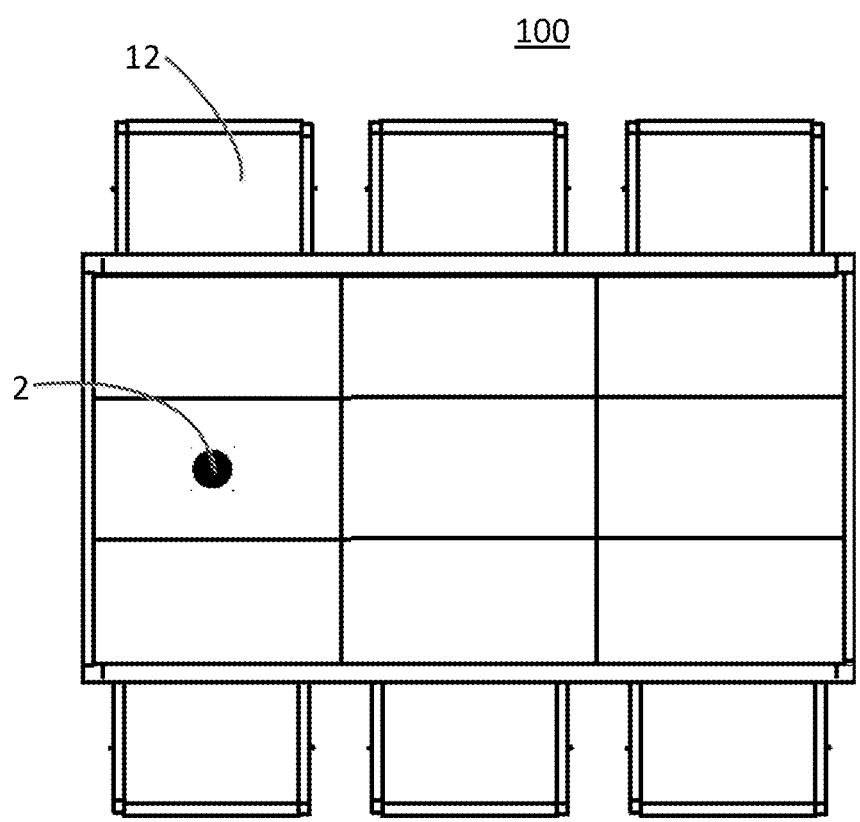
FIG. 2 shows a top view of the radiographic inspection device shown in FIG. 1.
Figure 3:
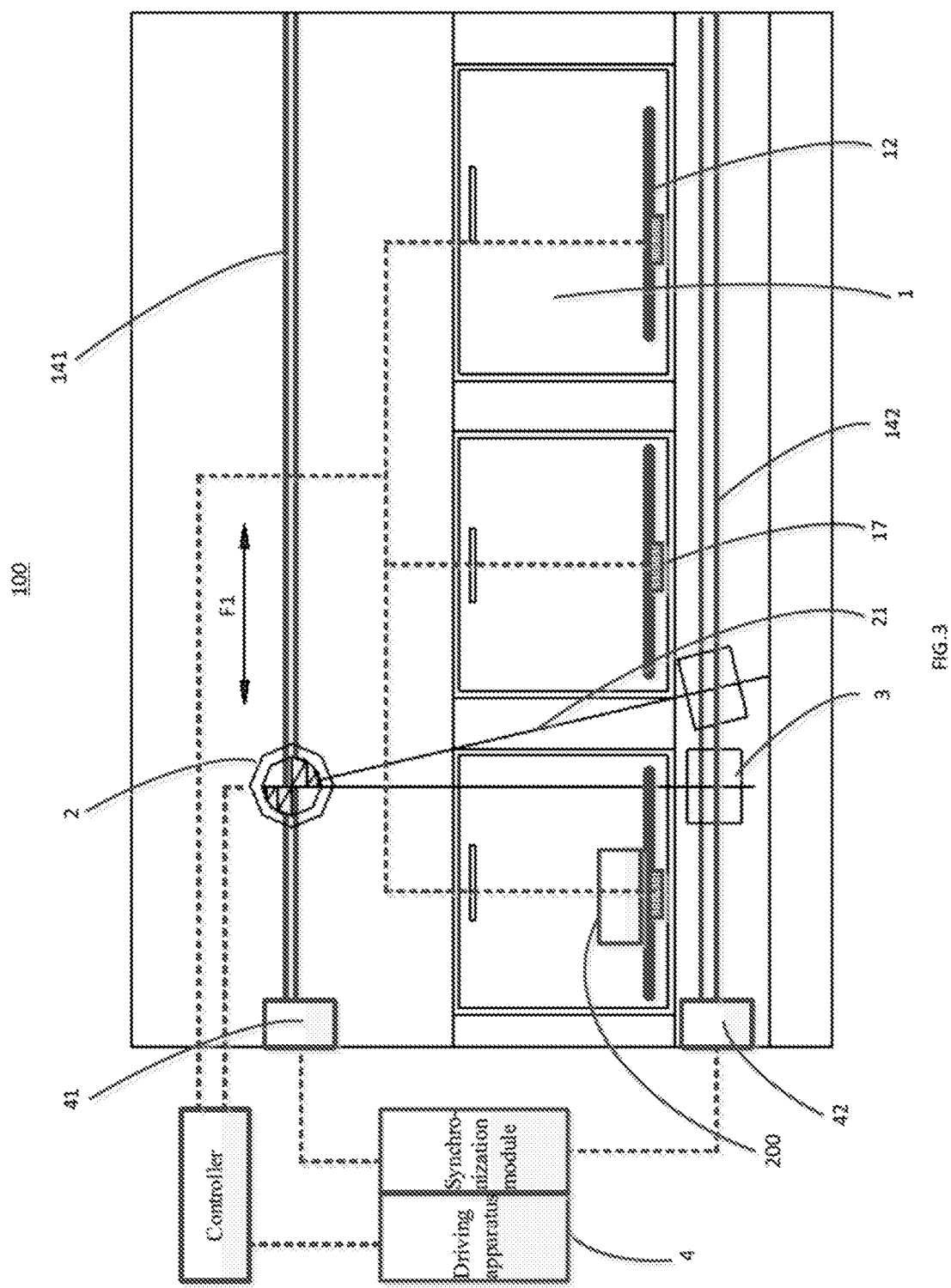
FIG. 3 shows a simple sectional view of a radiographic inspection device according to an exemplary embodiment of the present disclosure.
Figure 4:
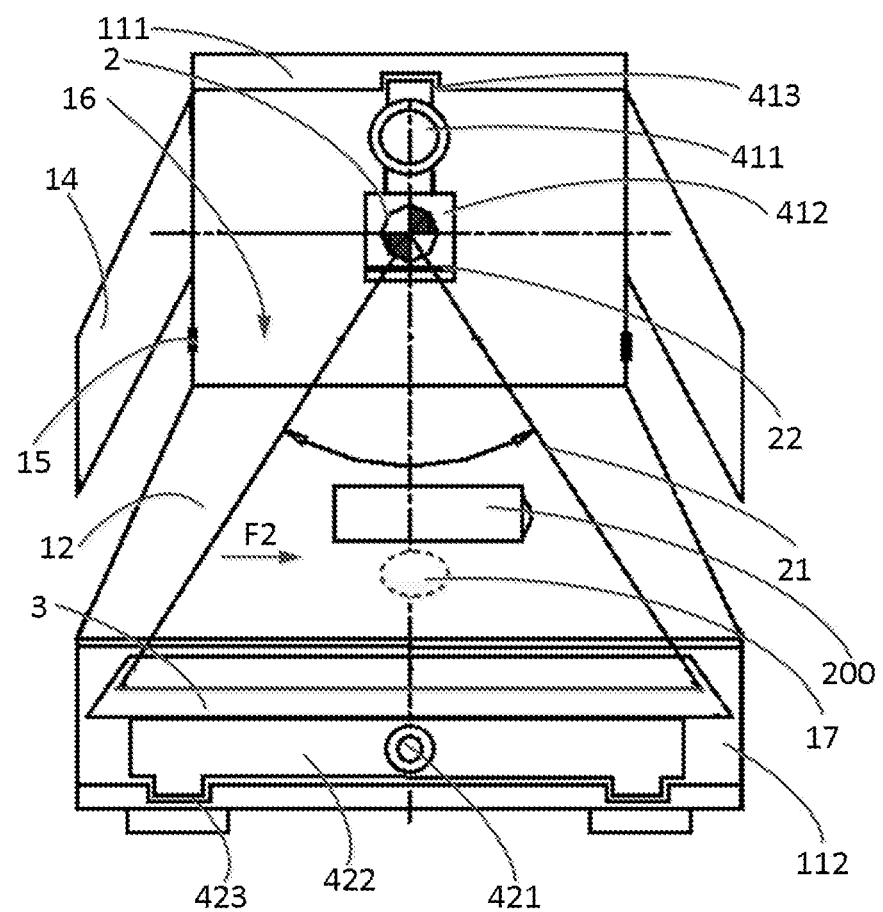
FIG. 4 shows a simple schematic diagram of scanning an item in one inspection channel in an exemplary embodiment of the present disclosure.

FIG. 1 shows a three-dimensional schematic view of a radiographic inspection device of an exemplary embodiment of the present disclosure. FIG. 2 shows a top view of the radiographic inspection device shown in FIG. 1. FIG. 3 shows a simple sectional view of a radiographic inspection device according to an exemplary embodiment of the present disclosure. FIG. 4 shows a simple schematic diagram of scanning an item in one inspection channel in an exemplary embodiment of the present disclosure.

In an exemplary embodiment, as shown in FIGS. 1 to 5, an radiographic inspection device 100 is applicable to inspect whether a prohibited item such as a restricted knife, a guns, a drug or an explosive exists in an object 200 or not, at places with high liquidity such as stations, airports, stadiums or shopping malls. The radiographic inspection device 100 includes: inspection channels 1, a scanning apparatus, a scanning apparatus 4 and a controller. The plurality of inspection channels 1 are arranged side by side, and each inspection channel is configured to carry an object 200 to be inspected. The scanning apparatus includes: a radiation source 2 mounted outside the plurality of inspection channels 1, and a receiving apparatus 3 mounted outside the plurality of inspection channels and configured to receive a radiation beam 21, such as an X-ray radiation beam, emitted from the radiation source 2. The driving apparatus 4 is configured to drive the radiation source 2 and the receiving apparatus 3 to move to a vicinity of each inspection channel 1. The controller is configured to control the scanning apparatus moved to the vicinity of one of the plurality of inspection channels 1 scan the object 200 in the one of the plurality of inspection channels 1.

In an exemplary embodiment, the driving apparatus is configured to drive the radiation source 2 and the receiving apparatus 3 to synchronously reciprocate in a first direction F1, so as to cause the scanning apparatus to move to the vicinity of each inspection channel 1 in sequence and scan an object in each inspection channel 1 in sequence.

According to the radiographic inspection device 100 of the embodiment of the present disclosure, the driving apparatus 4 drives the radiation source 2 and the receiving apparatus 3 to synchronously reciprocate, so as to cause the scanning apparatus to move to the vicinity of each inspection channel 1 in sequence. The controller controls the scanning apparatus moved to the vicinity of one of the plurality of inspection channels 1 scan the object 200 in the one of the plurality of inspection channels 1. In this way, the plurality of inspection channels may share one scanning apparatus, and the object to be inspected may be scanned separately in each inspection channel, so as to improve an efficiency of inspection.

As shown in FIGS. 1 to 4, in an exemplary embodiment, each inspection channel 1 includes an inspection space 16 enclosed by a housing 11 and a first sensor 17. The housing 11 includes a support frame and a shielding material covering the support frame, so as to avoid a leakage of radiation. The first sensor 17 is configured to detect whether the object 200 to be inspected exists in the inspection channel 1 or not. The controller controls the scanning apparatus to scan the object when the first sensor 17 detects that the object exists in the inspection channel. That is to say, when the first sensor 17 detects that the object 200 to be inspected does not exist in the inspection channel 1, the controller control the scanning apparatus to not move to the inspection channel in which the object 200 does not exist. Alternatively, when passing through the inspection channel in which the object 200 does not exist, the scanning apparatus is closed or a radiation beam is not emitted to the inspection channel. In this way, the radiation beam will not be irradiated into the inspection channel in which the object does not exist, so that a passenger will not be radiated by the radiation beam during placing the object 200 to be inspected into the inspection channel 1. The first sensor 17 may include a weight sensor or an optical sensor disposed at a bottom of the inspection channel.

In an exemplary embodiment, each inspection channel 1 further includes at least one gate 14, which is disposed at an entrance and/or an exit of the inspection space 16 and is configured to close the entrance and the exit during scanning of the object to be inspected which has been placed into the inspection space and/or close the entrance and the exit when a suspicious item is inspected in the object 200 by the scanning apparatus. FIG. 2 shows three inspection channels 16 in which one gate 14 is on the way of closing or opening, one gate is completely closed, and one gate is completely opened.

In an embodiment, each of an entrance of an inspection space 16 and an exit of the inspection space 16 is provided with a gate 14, such that the gate 14 at the entrance and the gate 14 at the exit are closed after an object 200 is placed into the inspection space 16 from the entrance. During scanning and/or when a suspicious item is inspected in the object 200 by the scanning apparatus, the gate 14 located at the entrance and the gate 14 located at the exit are kept closed, so as to avoid the object 200 from being taken out by the passenger. At the same time, an alarm of the radiographic inspection device 100 issues a sound and/or light warning, so as to prompt an inspector to open the gate of the entrance or the gate of the exit and take out the object 200 having the suspicious item for further processing. When the suspicious item is not inspected in the object 200 by the scanning apparatus, the gate of the entrance and the gate of the exit are opened automatically, so as to allow the passenger to take out the object 200 and allow a next object to be placed into the inspection space 16. In this way, objects to be inspected such as parcels, luggage, etc., belonging to different passengers, may be placed into the inspection space 16 in sequence and scanned independently without interfering with each other.

In an alternative embodiment, the inspection space 16 is provided with only one opening, through which the object 200 is placed into the inspection space 16 or the object 200 is taken out of the inspection space 16. The gate 14 is disposed at the opening, such that the gate 14 is closed after the object 200 is placed into the inspection space 16 from the opening. When the suspicious item is inspected in the object 200 by the scanning apparatus, the gate 14 is kept closed, so as to prevent the object 200 from being taken out by the passenger from. At the same time, the alarm of the radiographic inspection device 100 issues the sound and/or light warning, so as to prompt the inspector to open the gate of the entrance or the gate of the exit and take out the object 200 having the suspicious item for further processing. When the suspicious item is not inspected in the object 200 by the scanning apparatus, the gate of the entrance and the gate of the exit are opened automatically, so as to allow the passenger to take out the object 200 and allow the next object to be placed into the inspection space 16.

In an exemplary embodiment, each inspection channel further includes a second sensor 15 configured to detect that the gate 14 is closed or opened. The second sensor 15 may include an electrical approaching switch, a magnetic approaching switch or an optical sensor. The controller controls the scanning apparatus to scan the object 200 in the inspection space 16 only when the second sensor 14 detects that all the at least one gate 14 is closed. That is to say, when the second sensor detects that a gate 14 is not closed, the scanning apparatus does not scan the inspection channel with the gate being not closed. In this way, it is possible to avoid the object 200 from being placed into or being taken out during scanning.

In an exemplary embodiment, the scanning apparatus further includes a shielding apparatus 22. The shielding apparatus 22 is configured to prevent the radiation beam 21 emitted from the radiation source 2 from being emitted into the inspection space 16, when the first sensor 17 of the inspection channel 1 detects that no object exists 200 in the inspection space, or when the second sensor 15 of the inspection channel 1 detects that the gate 14 is opened. That is to say, in a case that no object exists 200 in the inspection space or the object is allowed to be placed into or taken out, meaning that the inspection channel 1 is not ready, the shielding device 22 will block the radiation beam 21 emitted from the radiation source 2 when the scanning device passes through the inspection channel 1, such that the radiation beam 21 does not irradiate into the inspection space. This shielding device is particularly suitable for the radiation source which continuously emits the radiation beam.

In an alternative embodiment, when the first sensor 17 of the inspection channel 1 detects that no object exists 200 in the inspection space or when the second sensor 15 of the inspection channel 1 detects that the gate 14 is opened, i.e. when the inspection channel is not ready, the controller turns off the radiation source 2 of the scanning device moved to the vicinity of the inspection channel 1, so that radiation source 2 does not generate a radiation beam 21. For example, if the radiation source is set to generate a pulsed radiation beam, the shutter-like shielding device may be omitted. In this case, when radiation source 2 passes through the inspection channel 1 which is not ready, the radiation source 2 is directly controlled to be turned off through the controller.

In an exemplary embodiment, when the first sensor 17 of the inspection channel 1 detects that no object exists 200 in the inspection space 16, or when the second sensor 15 of the inspection channel 1 detects that the gate 14 is opened, that is the inspection channel is not ready, the controller controls the driving apparatus 4 to drive the scanning apparatus to pass through the inspection channel 1 at a fast speed so as to move to a next inspection channel quickly, thereby improving an efficiency of scanning.

In an exemplary embodiment, as shown in FIGS. 1 to 4, the radiation source 2 is configured to emit a plurality of radiation beams 21 (two radiation beams 21 are shown in the figures) in different directions. The receiving apparatus 3 includes a plurality of detector arrays (two detector arrays are shown in the figures), in which receiving surfaces of the plurality of detector arrays are inclined with each other, so as to respectively receive the plurality of radiation beams 21 emitted in different directions. Since the plurality of detector arrays may receive radiation beams 21 emitted in different directions, scanning images of the object 200 in different directions may be obtained. In this way, it is possible to form dual-view images or even multi-view images, so as to improve an accuracy of inspection.

In an exemplary embodiment, as shown in FIGS. 3 to 4, the driving apparatus 4 includes: a first driving apparatus 41 configured to drive the radiation source 2 to move; a second driving apparatus 42 configured to drive the receiving apparatus 3 to move; and a synchronization module configured to control the first driving apparatus 41 and the second driving apparatus 42 to synchronously drive the radiation source 2 and the receiving apparatus 3. In this way, the radiation source and the receiving apparatus are kept aligned with each other.

In an exemplary embodiment, as shown in FIGS. 3 to 4, the first driving apparatus 41 includes a first driver, a first base 412 on which the radiation source 2 is mounted, and a first guide rail 413. The first driver drives the first base 412 to reciprocate straight along the first guide rail 413. Further, the first driver includes a first motor and a first screw 411. One end of the first screw 411 is coupled to an output shaft of the first motor, such that the first motor drives the first screw 411 to rotate. The first screw 411 fits the first base 412 by thread, such that a rotation of the first screw 411 is converted into a linear movement of the first base 412, and the first base 412 in turn drives the radiation source 2 to move straight. The first guide rail 413 may include a first groove disposed in an upper wall 111 of the housing 11 and extending along the first direction F1, and a first guide block disposed on the first base 412 and extending into the first groove. The first guide rail 413 may guide the first base 412 to reciprocate straight along the first direction F1 and prevent the first base 412 from rotating with the first screw 411.

In an exemplary embodiment, as shown in FIGS. 3 to 4, the second driving apparatus 42 includes a second driver, a second base 422 on which the receiving apparatus 3 is mounted, and a second guide rail 423. The second driver drives the second base 422 to reciprocate straight along the second guide rail 423. Further, the second driver includes a second motor and a second screw 421. One end of the second screw 421 is coupled to an output shaft of the second motor, and the second screw 421 fits the second base 422 by thread, such that a rotation of the second screw 421 is converted into a linear movement of the second base 422 and the second base 422 in turn drives the receiving apparatus 3 to move straight. Each of two second guide rail 423 may include a second groove disposed in a lower wall 112 of the housing 11 and extending along the first direction F1, and a second guide block disposed on the second base 422 and extending into the second groove. The second guide rail 423 may guide the second base 422 to reciprocate straight along the first direction F1 and prevent the second base 422 from rotating with the second screw 421.

Figure 5:
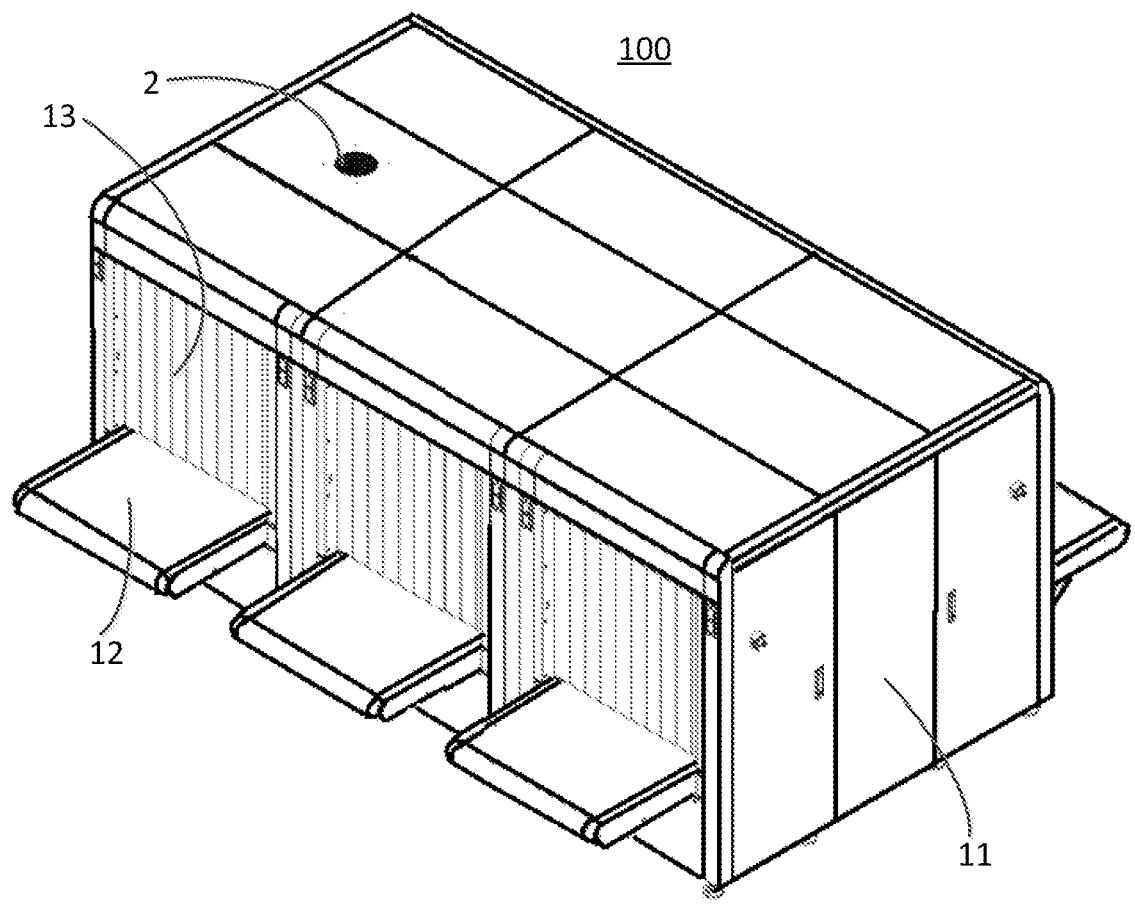
FIG. 5 shows a three-dimensional schematic view of a radiographic inspection device of another exemplary embodiment of the present disclosure.

FIG. 5 shows a three-dimensional schematic view of a radiographic inspection device of another exemplary embodiment of the present disclosure.

As shown in FIGS. 4 to 5, in an exemplary embodiment, each inspection channel 1 further includes a conveying apparatus 12 such as a belt conveyor. The conveying apparatus 12 is disposed at a lower part of the inspection space 11 and configured to convey the object 200 in a second direction F2 perpendicular to the first direction F1. The object 200 placed into the inspection channel 1 is conveyed into an inner of the inspection space 11 the conveying apparatus 12. In a case that the inspection space 11 is provided with the entrance and the exit, the conveying apparatus 12 conveys the object 200 from the entrance to the exit, and the object is taken out at the exit. In an alternative embodiment, in a case that the inspection space 11 is provided with only one opening, the conveying apparatus 12 conveys the object 200 from the entrance to a substantially middle position of the inspection space 11, and conveys the object back to the opening after the object is scanned, so that the object is taken out at the exit. Further, a shielding curtain 13, which shields the radiation beam 21 in the inspection channel 1, is disposed at the entrance of the inspection channel and/or the exit of the inspection channel. The object 200 enters or moves out of the inspection channel 1 by passing through the shielding curtain.

It may be understood by those of ordinary skill in the art, the conveying apparatus 12 is not necessary. In an alternative embodiment, the conveying apparatus may be omitted. In this way, the object placed into the inspection channel 1 does not move. Since the scanning apparatus may move in a horizontal direction, it is possible to realize scanning of the object placed into the inspection channel. Further, the shielding curtain may be omitted at the entrance of the inspection channel and the exit of the inspection channel, so as to further simplify a structure of the radiographic inspection device.

As shown in FIGS. 4 to 5, in an exemplary embodiment, the plurality of inspection channels 1 are arranged in a row in a horizontal direction, the radiation source 2 is disposed in the upper wall 111 of the housing 11 of the inspection channel 1, and the receiving apparatus 3 is disposed in the lower wall 112 of the housing 11 of the inspection channel 1.

Figure 10:
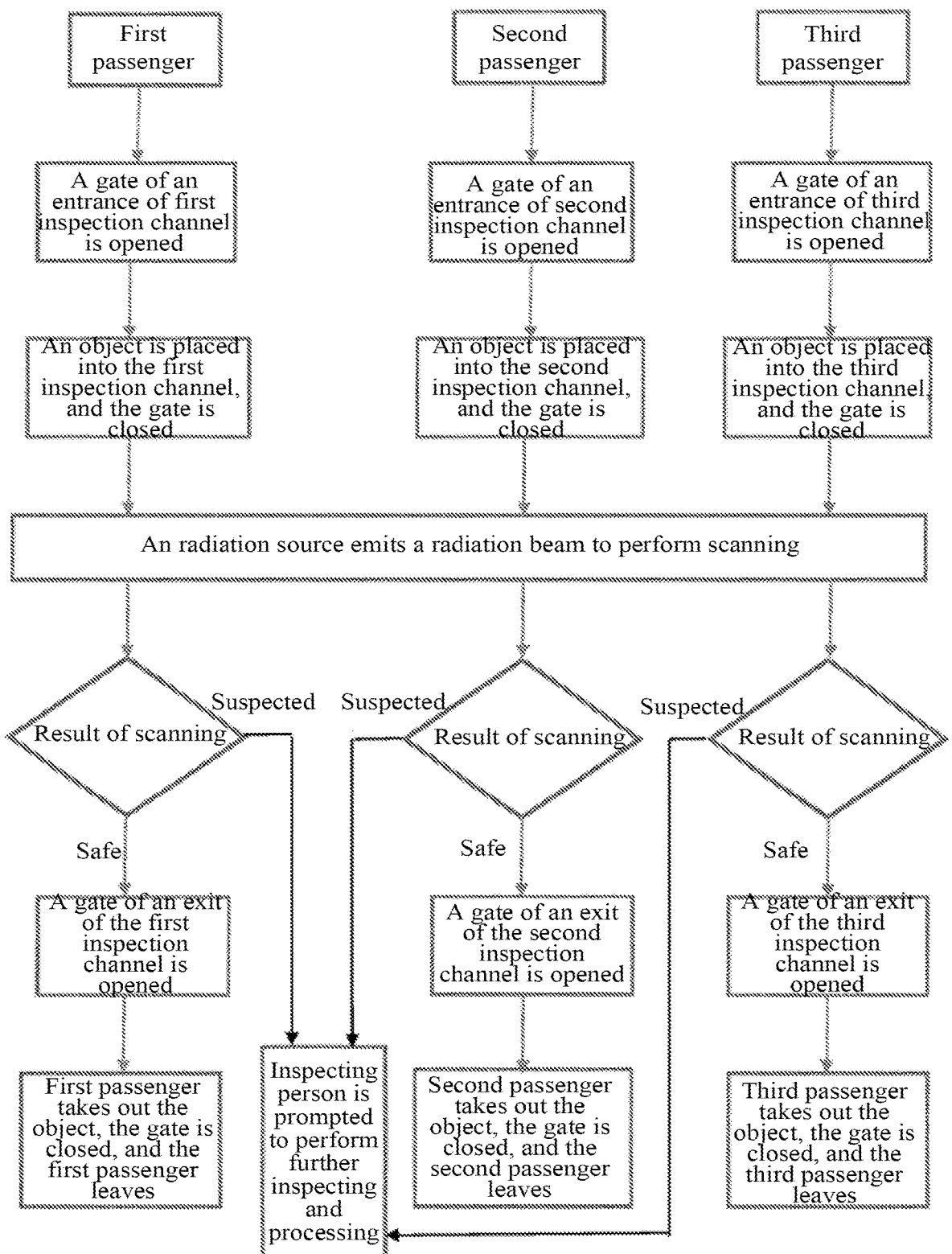
FIG. 10 shows a working flowchart of a radiographic inspection device of an exemplary embodiment of the present disclosure.

FIG. 10 shows a working flowchart of a radiographic inspection device of an exemplary embodiment of the present disclosure.

By taking the radiographic inspection device 100 shown in FIGS. 1 to 4 as an example, a working process of the radiographic inspection device in the embodiment of the present disclosure will be described below.

As shown in FIGS. 1 to 4 and FIG. 10, when scanning an object of a first passenger by using a first channel, the first passenger walks into the radiographic inspection device 100, and the gate of the entrance of the first inspection channel is opened. The first passenger places the object 100 such as a luggage or a parcel into first inspection channel, and the gate of the entrance and the gate of the exit are closed. The driving apparatus drives the radiation source of the scanning apparatus and the receiving apparatus to move to the first inspection channel, and the radiation source emits radiation beams and scans the object in the inspection channel. If a result of scanning indicates that the suspicious item exists in the object, the gate will be kept closed and an alarm is generated to prompt the inspecting person. The inspecting person opens the gate and takes out the object for further inspecting and processing. On the other hand, when the result of scanning indicates that no suspicious item exists in the object meaning that the object is safe, the gate is controlled to be opened, so as to allow the passenger to take out the object and then leave the inspection region.

An object of a second passenger and an object of a third passenger are inspected in sequence in the same manner as described above for the first passenger.

Figure 6:
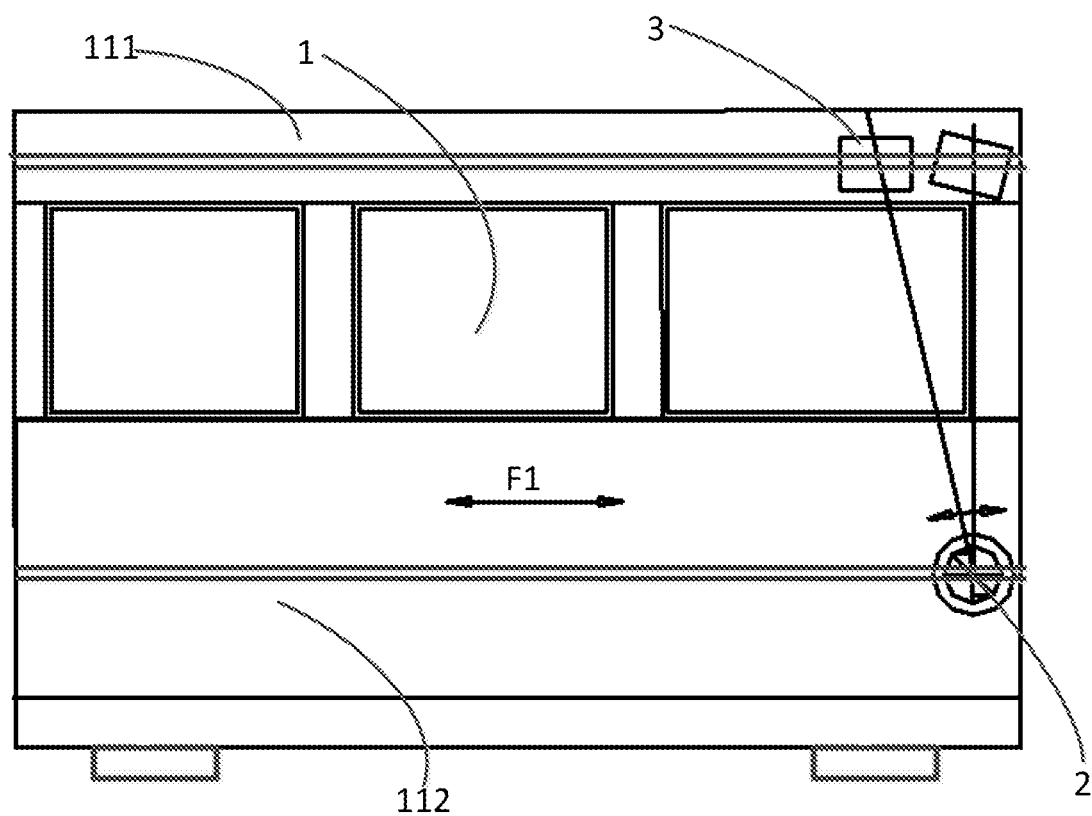
FIG. 6 shows a simple sectional view of a radiographic inspection device of yet another exemplary embodiment of the present disclosure.

FIG. 6 shows a simple sectional view of a radiographic inspection device of yet another exemplary embodiment of the present disclosure.

As shown in FIG. 6, in an exemplary embodiment, the plurality of inspection channel 1 are arranged in a row in a horizontal direction, the radiation source 2 is disposed in a lower wall 112 of a housing of the inspection channel 1, and the receiving apparatus 3 is disposed in an upper wall 111 of the housing of the inspection channel 1. As to other structures of the radiographic inspection device shown in FIG. 6, reference may be made to the radiographic inspection device shown in FIGS. 1 to 4, which will not be repeated here.

Figure 7:
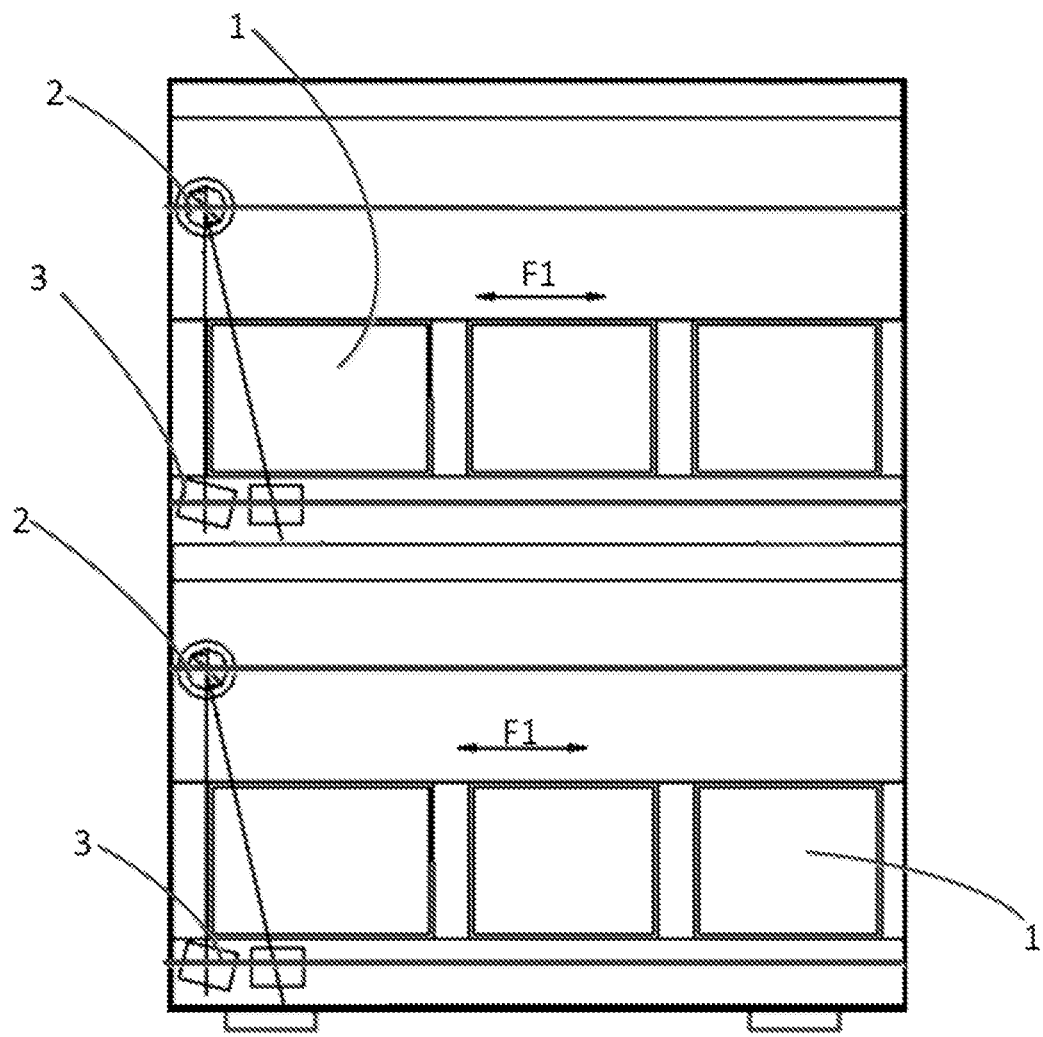
FIG. 7 shows a simple sectional view of a radiographic inspection device of another exemplary embodiment of the present disclosure.

FIG. 7 shows a simple sectional view of a radiographic inspection device of another exemplary embodiment of the present disclosure.

As shown in FIG. 7, in an exemplary embodiment, the plurality of inspection channels 1 are arranged in an upper row and a lower row which extend in a horizontal direction. One radiation source 2 and one receiving apparatus 3 are respectively disposed on opposite sides of each row of inspection channels 1. That is to say, the radiographic inspection device shown in FIG. 7 is equivalent to two radiographic inspection devices shown in FIGS. 1 to 4 being stacked, in which the two sets of radiographic inspection devices work independently, thereby improving the efficiency of security inspection.

Figure 8:
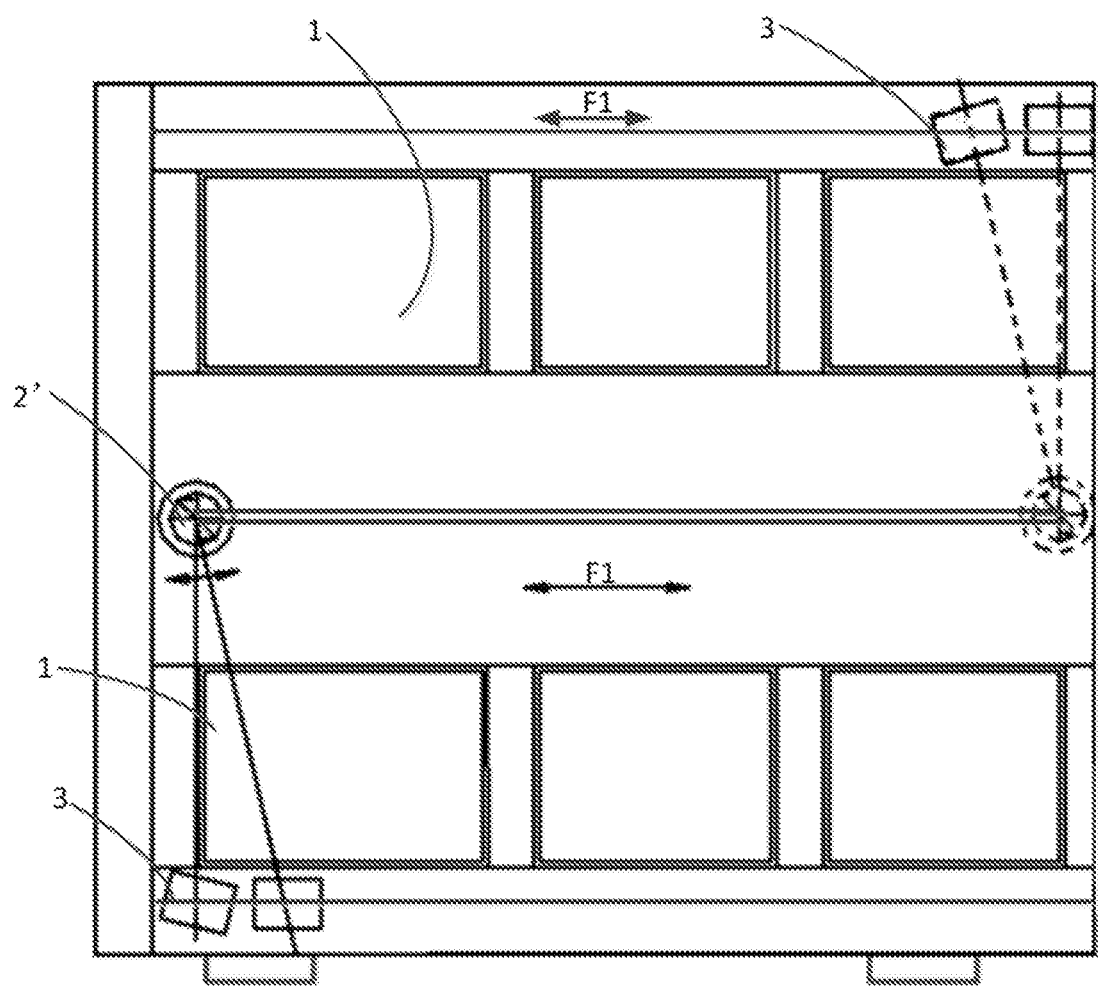
FIG. 8 shows a simple sectional view of a radiographic inspection device of another exemplary embodiment of the present disclosure.

FIG. 8 shows a simple sectional view of a radiographic inspection device of another exemplary embodiment of the present disclosure.

As shown in FIG. 8, in an exemplary embodiment, the plurality of inspection channels 1 are arranged in an upper row and a lower row which extend in a horizontal direction. One radiation source 2' is provided between two rows of inspection channels 1, and one receiving apparatus 3 is provided on a side of each row of inspection channels 1 opposite to the radiation source 2'. The radiation source 2' is rotatable, such that the radiation beam emitted from the radiation source 2' is selectively irradiated to the upper receiving apparatus 3 or the lower receiving apparatus 3. That is to say, in the radiographic inspection device of the embodiment, the radiation source 2' may not only reciprocate straight along the first direction (the horizontal direction) F1 by driving of the driving apparatus, but also rotate around a center of a target by controlling of the controller.

During scanning a plurality of objects, when the radiation source 2' for emitting X-ray is in a left position denoted by a solid line, a ray window of the radiation source 2' is directed downwards to be over against the lower receiving apparatus 3 including detector arrays. The lower receiving apparatus 3 and the radiation source 2' move synchronously in the horizontal direction, so that the objects in the lower inspection channels 1 are scanned. When the radiation source 2' moves to a right position denoted by a dotted line, the radiation source 2' rotates by 180 degrees with respect to bull's-eye, such that the ray window is directed upwards to be over against the upper receiving apparatus 3. The lower receiving apparatus 3 and the radiation source 2' move synchronously in the horizontal direction, so that the objects in the upper inspection channels 1 are scanned. When the radiation source 2' moves to the left position, it rotates by 180 degrees in an opposite direction, and starts to scan the objects in the lower inspection channels 1.

Figure 9:
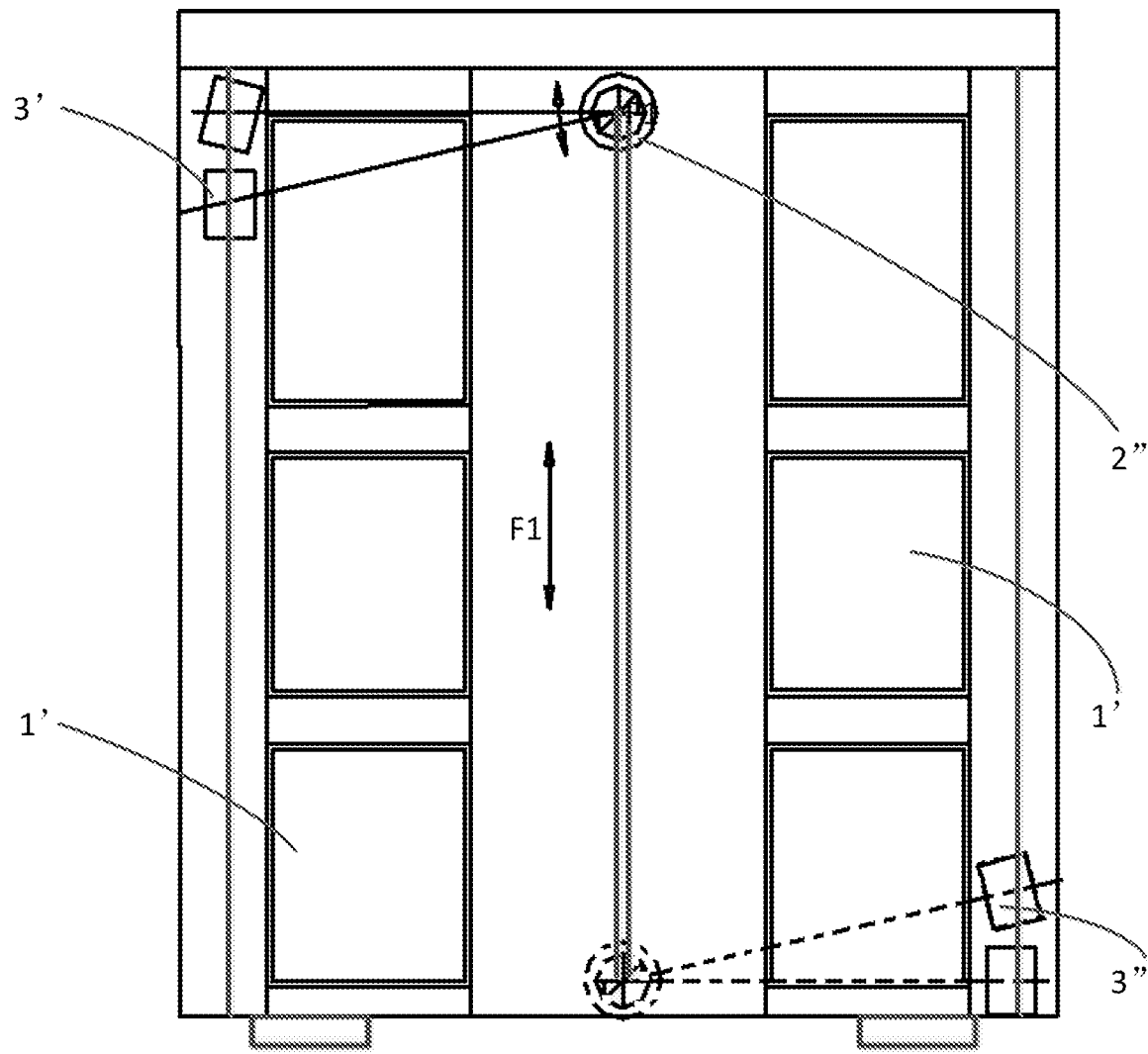
FIG. 9 shows a simple sectional view of a radiographic inspection device of another exemplary embodiment of the present disclosure.

FIG. 9 shows a simple sectional view of a radiographic inspection device of another exemplary embodiment of the present disclosure.

As shown in FIG. 8, in an exemplary embodiment, the plurality of inspection channels 1' are arranged in a right row and a left row which extend in a vertical direction. One radiation source 2" is provided between the two rows of inspection channels 1', and one receiving apparatus 3' is provided on a side of each row of inspection channels 1' opposite to the radiation source 2". The radiation source 2" is rotatable, such that the radiation beam emitted from the radiation source 2" is selectively irradiated to the receiving apparatus 3' located on the left or the receiving apparatus 3' located on the right.

During scanning a plurality of objects, when the radiation source 2" for emitting X-ray is in an upper position denoted by a solid line, a ray window of the radiation source 2" is directed to the left to be over against the receiving apparatus 3' including detector arrays on the left side. The receiving apparatus 3' on the left side and the radiation source 2" move down synchronously, so that the objects in the plurality of inspection channels 1' on the left side are scanned. When the radiation source 2" moves to a lower position denoted by a dotted line, the radiation source 2" rotates by 180 degrees with respect to bull's-eye, such that the ray window is directed to the right to be over against the receiving apparatus 3' on the right side. The receiving apparatus 3' on the right side and the radiation source 2' move up synchronously, so that the objects in the plurality of inspection channels 1' on the right side are scanned. When the radiation source 2" moves to the upper position, it rotates by 180 degrees in an opposite direction, and starts to scan the objects in the inspection channels 1 on the left side.

In another exemplary embodiment, the plurality of inspection channels are arranged in a right row and a left row which extend in a vertical direction. One radiation source and one receiving apparatus are respectively disposed on opposite sides of each row of inspection channels.

In the above embodiments, description is made by taking one row of inspection channels including three independent inspection channels as an example. It may be understood by those of ordinary skill in the art that one row of inspection channels may include two, four or even more inspection channels. An appropriate number of inspection channels may be provided as desired by the user.

According to the radiographic inspection device provided by the above embodiments of the present disclosure, one or more columns of receiving devices (detector arrays) and a radiation source for generating X-ray beams reciprocate straight along a direction perpendicular to an extension direction of the inspection channels. In a direction along which the radiation source is moved, a plurality of inspection channels of different sizes may be provided as desired. Scanning of the objects in the inspection channels is achieved through a translation of the detector arrays and the radiation source, and an intelligent analyzing of the image is performed. Each inspection channel may be imaged independently, and the objects to be inspected may be independently placed into and taken out, so as to achieve a purpose of simultaneous security inspection for more than one person and greatly improve the efficiency of security inspection.

The radiographic inspection device of embodiments of the present disclosure may be disposed at large public places such as stadiums, cinemas, shopping malls and concerts, so as to allow a large stream of concentrated people to pass through the security inspection quickly, reducing the cost of the security inspection.

It may be understood by those of ordinary skill in the art that the above-described embodiments are exemplary, and those of ordinary skilled in the art may improve them. The structures described in various embodiments may be combined freely in teens of structures or principles not conflicting with each other.

Although the present disclosure has been described with reference to accompanying drawings, embodiments disclosed in the accompanying drawings are intended to illustrate preferred embodiments of the present disclosure, and should not be construed as a limitation of the present disclosure. Although embodiments of the present disclosure have been illustrated and described, it may be understood by those of ordinary skill in the art that these embodiments may be changed without departing from the principle and spirit of the present disclosure. The scope of the present disclosure is defined by the appended claims and their equivalents.

What is claimed is:

1. A radiographic inspection device, comprising:
    a plurality of inspection channels arranged side by side, each inspection channel configured to carry an object to be inspected;
    a scanning apparatus, comprising:
    a radiation source mounted outside the plurality of inspection channels;
    a receiving apparatus mounted outside the plurality of inspection channels and configured to receive a radiation beam emitted from the radiation source;
    a driving apparatus configured to drive the radiation source and the receiving apparatus to move to a vicinity of each inspection channel; and
    a controller configured to control the scanning apparatus moved to the vicinity of one of the plurality of inspection channels to scan the object in the one of the plurality of inspection channels.

2. The radiographic inspection device of claim 1, wherein the driving apparatus is configured to drive the radiation source and the receiving apparatus to synchronously reciprocate in a first direction, so as to cause the scanning apparatus to move to the vicinity of each inspection channel in sequence.

3. The radiographic inspection device of claim 1, wherein each inspection channel comprises:
    an inspection space enclosed by a housing; and
    a first sensor configured to detect whether the object exists in the inspection channel, wherein the controller controls the scanning apparatus to scan the object when the first sensor detects that the object exists in the inspection channel.

4. The radiographic inspection device of claim 3, wherein each inspection channel further comprises:
at least one gate disposed on at least one of an entrance of the inspection space and an exit of the inspection space, and configured to close the entrance and the exit during scanning of the object to be inspected which has been placed into the inspection space and/or close the entrance and the exit when a suspicious item is inspected in the object by the scanning apparatus.

5. The radiographic inspection device of claim 3 or 4, wherein each inspection channel comprises:
a second sensor configured to detect that the gate is closed or opened,
wherein the controller controls the scanning apparatus to scan the object in the inspection space when the second sensor detects that the at least one gate is closed.

6. The radiographic inspection device of claim 5, wherein the scanning apparatus further comprises a shielding apparatus configured to prevent the radiation beam emitted from the radiation source from being emitted into the inspection space, when the first sensor of the inspection channel detects that no object exists in the inspection space, or when the second sensor of the inspection channel detects that the gate is opened.

7. The radiographic inspection device of claim 5, wherein the controller turns off the radiation source of the scanning apparatus moved to the vicinity of the inspection channel, when the first sensor of the inspection channel detects that no object exists in the inspection space, or when the second sensor of the inspection channel detects that the gate is opened.

8. The radiographic inspection device of claim 6 or 7, wherein the controller controls the driving apparatus to drive the scanning apparatus to pass through the inspection channel at a fast speed, when the first sensor of the inspection channel detects that no object exists in the inspection space, or when the second sensor of the inspection channel detects that the gate is opened.

9. The radiographic inspection device of claim 1, wherein the radiation source is configured to emit a plurality of radiation beams in different directions; and
the receiving apparatus comprises a plurality of detector arrays, in which receiving surfaces of the plurality of detector arrays are inclined with each other, so as to respectively receive the plurality of radiation beams emitted in different directions.

10. The radiographic inspection device of claim 1, wherein the driving apparatus comprises:
a first driving apparatus configured to drive the radiation source to move;
a second driving apparatus configured to drive the receiving apparatus to move; and
a synchronization module configured to control the first driving apparatus and the second driving apparatus to synchronously drive the radiation source and the receiving apparatus.

11. The radiographic inspection device of claim 10, wherein the first driving apparatus comprises:
a first driver;
a first base on which the radiation source is mounted; and
a first guide rail, wherein the first driver drives the first base to reciprocate straight along the first guide rail.

12. The radiographic inspection device of claim 11, wherein the first driver comprises:
a first motor; and
a first screw, wherein one end of the first screw is coupled to an output shaft of the first motor, and the first screw fits the first base by thread, such that a rotation of the first screw is converted into a linear movement of the first base.

13. The radiographic inspection device of claim 10, wherein the second driving apparatus comprises:
a second driver;
a second base on which the receiving apparatus is mounted; and
a second guide rail, wherein the second driver drives the second base to reciprocate straight along the second guide rail.

14. He radiographic inspection device of claim 13, wherein the second driver comprises:
a second motor; and
a second screw, wherein one end of the second screw is coupled to an output shaft of the second motor, and the second screw fits the second base by thread, such that a rotation of the second screw is converted into a linear movement of the second base.

15. The radiographic inspection device of claim 1, wherein the plurality of inspection channels are arranged in a row in a horizontal direction,
the radiation source is disposed in an upper wall of a housing of the inspection channel, and the receiving apparatus is disposed in a lower wall of the housing of the inspection channel.

16. The radiographic inspection device of claim 1, wherein the plurality of inspection channels are arranged in a row in a horizontal direction,
the radiation source is disposed in a lower wall of a housing of the inspection channel, and the receiving apparatus is disposed in an upper wall of the housing of the inspection channel.

17. The radiographic inspection device of claim 1, wherein the plurality of inspection channels are arranged in an upper row and a lower row which extend in a horizontal direction,
one radiation source and one receiving apparatus are respectively disposed on opposite sides of each row of inspection channels.

18. The radiographic inspection device of claim 1, wherein the plurality of inspection channels are arranged in an upper row and a lower row which extend in a horizontal direction,
one radiation source is provided between upper row of inspection channels and the lower row of inspection channels, and one receiving apparatus is provided on a side of each row of inspection channels opposite to the radiation source,
wherein the radiation source is rotatable, such that the radiation beam emitted from the radiation source is selectively irradiated to the receiving apparatus.

19. The radiographic inspection device of any ene of claim 1, wherein the plurality of inspection channels are arranged in a right row and a left row which extend in a vertical direction,
one radiation source is provided between the right row of inspection channels and the left row of inspection channels, and one receiving apparatus is provided on a side of each row of inspection channels opposite to the radiation source,
wherein the radiation source is rotatable, such that the radiation beam emitted from the radiation source is selectively irradiated to the receiving apparatus.

20. The radiographic inspection device of claim 1, wherein the plurality of inspection channels are arranged in a right row and a left row which extend in a vertical direction, and
- one radiation source and one receiving apparatus are respectively disposed on opposite sides of each row of inspection channels,
- wherein each inspection channel further comprises a conveying apparatus disposed at a lower part of the inspection channel and configured to convey the object in a second direction perpendicular to a first direction.

* * * * *